Patented Dec. 25, 1945

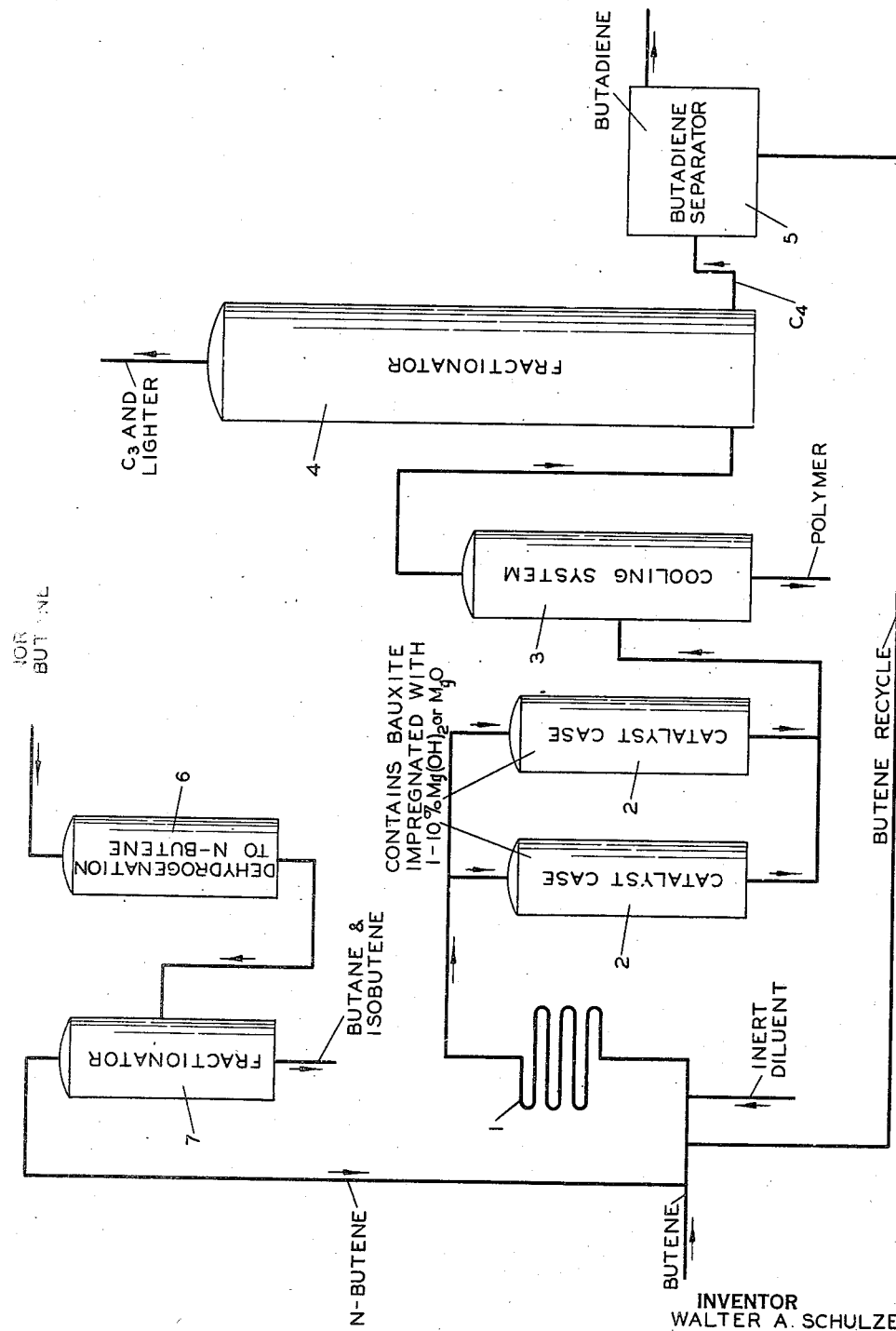

2,391,646

UNITED STATES PATENT OFFICE 2,391,646

PROCESS FOR DEHYDROGENATING OLEFINS

Walter A. Schulze, John C. Hillyer, and Harry E. Drennan, Bartlesville, Okla., assignors to Phillips Petroleum Company, a corporation of Delaware Application February 2, 1942, Serial No. 429,332

4 Claims. (Cl. 260—680)

This invention relates to an improved process for dehydrogenating olefins to produce valuable aliphatic conjugated diolefins. It relates more particularly to a process for dehydrogenating normal butylenes to produce butadiene. These diolefins are especially valuable as raw materials for the production of synthetic rubber.

In a more specific sense, the invention is concerned with a novel process for controllably increasing the degree of unsaturation in hydrocarbons of the type mentioned by employing especially treated catalysts so that the monoolefinic hydrocarbons are converted into diolefins with a higher yield of diolefins and a practical minimum of undesirable accompanying reactions. In particular, the isomerization of normal monoolefins to the undesirable isoolefins, especially of normal butenes to isobutene in the production of butadiene, is reduced to a minimum.

Heretofore, it has been the practice of those attempting to convert monoolefins to diolefins to employ catalysts chosen from the group which has been found more or less satisfactory for the dehydrogenation of paraffins to form monoolefins. In some cases, minor yields of diolefins have been obtained, but in general, the low yields and the difficulties of control so as to avoid excessive losses due to cracking and polymerization have made the process unattractive on a commercial scale. Many of the catalysts which have been employed also promote isomerization of the normal monoolefins to isoolefins, which because of their branched chain structure cannot yield the desired diolefin on dehydrogenation, and by their formation thereby contribute still further to the unsatisfactory yields of diolefins obtainable.

We have found by experimental tests in which equilibrium values have been substantially attained that the concentration of diolefins formed from monoolefins at a given temperature is extremely small compared with the concentration of monoolefins formed by the dehydrogenation of paraffins at the same temperature. One possible expedient for increasing the degree of conversion in the dehydrogenation of monoolefins is to increase the activity of a catalyst by operating at higher temperature, since it has been noted that the conversion of monoolefins is markedly increased by operating at temperatures about 100 to 200° F. above those required for the dehydrogenation of paraffins using the same catalyst. However, it has likewise been proved that the increased cracking and polymerization losses and the exceedingly rapid poisoning of the catalyst by carbon deposition overbalance the increase in conversion. Thus, while it is desirable to dehydrogenate monoolefins at high temperature, the catalysts usually considered for the dehydrogenation are not satisfactory at said high temperatures.

In carrying out the catalytic dehydrogenation of butenes, a considerable quantity of polymeric material containing more than four carbon atoms per molecule is also formed because the catalysts used ordinarily promote this polymerization to a certain degree. The heavier polymers which are formed are split to a large extent, resulting in deposition of carbon on the catalyst as well as production of light gases. Thus, when using a very active catalyst in olefin dehydrogenation, the yield is often reduced by polymerization which contributes still further to operating difficulties, product losses and low hydrocarbon recovery.

We have also found that still further losses of normal olefins occur through isomerization reactions in which products of the same number of carbon atoms are formed, but which cannot because of their structure serve as sources of the desired aliphatic conjugated diolefins. Thus, in dehydrogenation of butenes, a considerable proportion of isobutene may be formed which in turn yields only a negligible amount of butadiene on conversion. The isobutene formed is valueless for further dehydrogenation and correspondingly reduces the recovery of unconverted normal butenes. The usual dehydrogenation catalysts ordinarily also promote this isomerization reaction quite actively, especially during the initial stages of the conversion period while highly active surface of the catalyst is exposed. The loss of butene feed stock due to the formation of these isomers may be considerable and yields of diolefins may be seriously lowered, particularly during relatively short conversion periods.

From the foregoing, it will be evident that a suitable catalyst for the dehydrogenation of olefins must retain for a reasonable period a high degree of activity at operating temperatures appreciably higher than those considered for other dehydrogenation reactions. Further, said catalyst must be quite specific in promoting only the dehydrogenation reaction in order that isomerization, cracking and polymerization of the hydrocarbons and coking of the catalyst be suppressed. In the absence of any known dehydrogenation catalyst which fulfilled these qualifications, we have discovered means of modifying the activity of a preferred mineral catalyst to suit our purposes.

The natural mineral ore bauxite is a catalyst which has been applied with great success to the dehydrogenation of paraffin hydrocarbons at temperatures in the range of 900° to 1100° F. The dehydrogenation of olefins over a bauxite catalyst at temperatures between 1100° and 1300° F. which were required for satisfactory conversion indicated satisfactory activity in the production of diolefins, but operating cycles were extremely short due to rapid poisoning of the catalyst.

In our copending application, Serial No. 353,961, filed August 23, 1941, we have disclosed means whereby natural bauxite catalyst may be subjected to a certain "deactivation" treatment, whereby its activity with regard to splitting and polymerization reactions is greatly reduced, while at the same time the dehydrogenating activity is maintained at a desirable level. This modification is readily accomplished by impregnating the bauxite with a minor proportion, usually from 1 to 10 per cent of barium or strontium hydroxide.

We have now discovered a process whereby the dehydrogenation of olefins over bauxite catalyst can be still further improved. By the process of the present invention, the isomerization of normal olefins to isoolefins is greatly suppressed by a modification of the bauxite catalyst, while maintaining the dehydrogenating activity of the catalyst at a desirable level. This production of a valuable modified activity catalyst together with the improved olefin dehydrogenation resulting from its use are the principal objects of this invention.

According to the present invention, dehydrogenation catalysts are prepared from the mineral bauxite by impregnating the bauxite with a minor proportion, usually from about 1 to about 10 per cent by weight, of magnesium hydroxide. The bauxite so treated may be the natural ore without any pretreatment except perhaps calcining to increase its adsorptive power. In many cases, however, it is preferred to employ bauxite either previously or subsequently treated with minor amounts of barium or strontium hydroxide in the manner of the above mentioned application, Serial No. 353,961.

It is not always essential that barium or strontium hydroxides be included in the preparation of a catalyst of very low activity for olefin isomerization, and a satisfactory catalyst with selective activity can be produced from bauxite and magnesium hydroxide or oxide. When the bauxite bears barium or strontium hydroxide as well as magnesium hydroxide or oxide, the resulting increased specificity for dehydrogenation and the substantial suppression of isomerization, polymerization and cracking reactions produce a highly satisfactory catalyst for olefin dehydrogenation.

The catalysts of the present invention enable operation at temperatures conducive to good yields of diolefins, such as from about 1100° to about 1300° F. in the dehydrogenation of normal butenes. At the lower temperatures producing equilibrium dehydrogenation, the undesirable side reactions are so greatly reduced that the process can be carried out much more economically. And when operating at the higher temperatures within this range, formerly considered too high for such reactions, greatly increased ultimate yields can be obtained due to suppressed decomposition and isomerization over our preferred catalysts.

A suitable catalyst preparation procedure comprises spraying or otherwise treating calcined bauxite with a solution of magnesium hydroxide to deposit thereon the desired quantity of the solute. Since magnesium hydroxide is only very slightly soluble in water, it is necessary to use a solvent, such as a concentrated aqueous solution of ammonium chloride or acetate, or of ammonium hydroxide and a volatile ammonium salt, or the like. The bauxite takes up the aqueous solution and immediately appears dry. It is ready for use after being dried at elevated temperature in a slow stream of gas, which carries off not only the moisture but also the decomposition products of the ammonium salts deposited simultaneously. In this drying step, the magnesium hydroxide is probably wholly or partially converted to the oxide (magnesia), in which form it apparently exists during use. The catalyst may now be given a second treatment with the aqueous solution if it is desired to add more magnesia than possible in one treatment, in which case the drying at elevated temperature is usually repeated. The quantity of magnesia used may be varied, generally from about 1 to about 10 weight per cent of the bauxite being the limits of valuable concentrations. Often five per cent by weight of the bauxite is a satisfactory amount. Instead of magnesium hydroxide, we may use a solution of a soluble magnesium salt which is converted to the hydroxide by subsequent treatment with a hydroxide such as ammonium hydroxide, removing the other salts by washing or other suitable means. A colloidal solution or suspension of magnesia may be prepared and used to impregnate the catalyst.

In preparing a catalyst comprising bauxite impregnated with both magnesia and barium hydroxide, a similar process is followed in impregnating the catalyst with barium hydroxide. A hot aqueous solution is usually the most convenient source of barium hydroxide. The barium may be added before the magnesia, with intermediate drying, or subsequent to the magnesia treatment. Or, in some instances, if desired, both may be added simultaneously. The salt solutions may be applied to the catalyst by other methods, such as soaking the catalyst therein, but we prefer to spray the bauxite with finely-divided solutions or suspensions if possible. In this way, a very definite quantity can be added and uniform distribution may be obtained.

The bauxite used for the catalyst may be selected in accordance with the usual requirements for catalytic processes, hard, rugged, and free of dust. From about 6 mesh to about 20 mesh particles are preferred, allowing reductions in flow rate proportionate to the decreased catalyst surface when using the coarser catalysts. The elimination of iron oxide impurity from the bauxite is important and all separate particles of iron oxide should be removed by one of the well known processes, such as magnetic or gravity separation. Carbon formation is very serious at localized points wherever a nucleus of iron oxide exists, forming a very voluminous deposit and causing considerable back pressure to develop.

On one specific embodiment, butadiene is produced from butenes diluted with an inert gas by contacting with bauxite which has been treated with five weight per cent each of barium hydroxide and magnesium hydroxide at a temperature of 1200° F. and space velocity of about 1300 vapor volumes per hour, cooling the effluents, separating the light gases, then separating the butadiene from the unreacted butenes and recycling the latter for further conversion. If desired, the butadiene may be separated from the effluents prior to removal of the light gases.

The process may be more readily understood by reference to the accompanying drawing. This represents schematically one form of apparatus in which the process may be carried out. In the figure, 1 is a heater into which the butenes and the diluent gas entering the system are first led and vaporized, and heated to the proper dehydrogenating temperature. Leaving the heater, the heated vapors enter catalyst chamber 2, where they contact the bauxite catalyst bearing magnesia and barium hydroxide. The vapors then pass through a cooling system 3, wherein any heavy polymers formed may be removed and enter fractionating unit 4, in which light gases and hydrogen formed in the reaction and diluent gas are separated from the C4 fraction. Leaving the fractionating unit, this material passes to butadiene separator 5, in which butadiene is separated from the mixed butenes by suitable means and is sent to storage. The method of separating butadiene is not per se part of the present invention but may be any one of a number of known methods of accomplishing this result, such as formation of sulfone, separation, and decomposition to liberate the butadiene. The butenes remaining are ordinarily recycled to heater 1 and pass through the system again and are further converted; or alternately, they may pass directly to storage.

In operating our process for the production of butadiene, either of the normal butenes may be used, or any convenient or available mixture of them, with satisfactory results. In many cases dehydrogenation of the olefin will follow as the second stage to a dehydrogenation step 6 applied to normal butane. In such cases, one or both of the normal butenes may be concentrated from the effluents of the first dehydrogenation step in a fractionator 7 and employed as the feed stock to the second step. The mixed butenes derived from crack still gases are also satisfactory charging stocks. The presence of some isobutene in such a charge stock is not objectionable, but provision must be made for its separation from the recycle stream by suitable means in order to prevent its pyramiding in this stream due to its relatively greater stability. The use of our preferred catalyst reduces isomerization in the catalyst chamber to a minimum; but to realize the best possible yields from the butene charged, the isobutene which yields almost no butadiene must be kept at a low level in the charge to the catalyst. This may be accomplished by prefractionation of the feed to remove iso-aliphatic hydrocarbons from the feed stocks and by suitable restriction of the isoolefin content of recycle streams in accordance with the purposes and teachings of the present invention.

In operating our process, we prefer to use temperatures of from about 1100° to about 1300° F., although the range from about 1100 to about 1400° F. is suitable in some instances. Space velocities of about 500 to 5000 volumes per hour may be used and we often prefer to use values within the range of 1000 to 1500 volumes per hour. In one modification of the process, we do not employ pressures appreciably above atmospheric, at least prior to fractionation. In other modifications of the process, moderate pressures up to two hundred pounds gage may be used. It is necessary to main the partial pressure of butenes at a figure below atmospheric and ordinarily below 0.5 atmosphere. Thus, it is often preferred to operate with butene partial pressures in the range of 0.1 to 0.25 atmosphere. This is most readily accomplished by dilution with an inert gas, although vacuum operation may be used if desired.

Diluent gases which may be used comprise water vapor, the hydrocarbons more refractory than butenes, particularly methane, ethane, and propane, and other inert gases, especially carbon dioxide, hydrogen, and nitrogen. In many cases water vapor is the preferred diluent due to its availability and beneficial effects in the dehydogenation reaction. While hydrogen may be used, the presence of any considerable amount of it when the partial pressure of butene is also low adversely affects the equilibrium in the olefin-diolefin conversion.

The steps of cooling and fractionating both the light gases and heavy polymer may be carried out in a single step or by means of combinations of polymer separators, partial coolers, and one or more fractionating columns. A variety of operations is possible and economic and other factors will dictate the choice of equipment used. If the diluent gas is separated from the light gases formed in the reaction, it can, of course, be recycled with fresh charge.

The C4 fraction resulting from fractionation may be treated by any one of the well known methods whereby butadiene is extracted and recovered from its mixtures with butenes. The remaining butenes are ordinarily then recycled to the process, but may, of course, be used for other purposes if desired.

The catalyst life obtained in the use of our catalyst depends upon the material being treated as well as the severity of treating conditions and may vary between rather wide limits. Under preferred conditions of treatment of butenes, a normal life is from four to sixteen hours before regeneration is required. Regeneration may be accomplished by burning with air, oxygen, or oxygen-containing gases. We prefer to control the combustion so that regeneration proceeds over a period substantially shorter than the operating cycle and to maintain the temperature of regeneration between about 1000° and 1400° F. By this process carbon and tarry deposits are burned from the catalyst grains and their original active surface and porosity are restored. The catalyst may be regenerated many times without appreciable deterioration.

Untreated bauxite when used for the dehydrogenation of butenes exhibits a considerable period of low butadiene production, hereinafter termed an induction period, before maximum conversion to butadiene is reached. After the maximum is reached, the activity declines rapidly due to carbon deposition. This maximum is reached ordinarily in about two hours and over all efficiency is low because a conversion period of about 2 to 4 hours is often as long as can be operated between catalyst regenerations. During the induction period a large quantity of isobutene is found in the effluents, and the formation of much heavy polymer is noticed, together with a large volume of low density gas.

When the catalyst employed is bauxite treated with magnesium oxide, in accordance with the present invention, the quantity of isobutene formed during the induction period is very markedly decreased. The recovery of unreacted normal butene is thereby increased by a substantially equivalent amount, and the overall yield of butadiene may also be slightly increased due to the greater concentration of convertible normal butene in the catalyst chamber. The average efficiency over the entire conversion period is therefore increased by the suppression of the isomerization reaction, even though the greatest improvement is noted during the so-called induction period when isobutene formation over previously-described catalysts is very high.

When our preferred catalyst is used, comprising bauxite which has been treated with magnesium hydroxide and/or oxide and barium and/or strontium hydroxide, the yield of butadiene over a similar period of operation is markedly increased, and the conversion to undesired isobutene is satisfactorily suppressed. This is due to the fact that the results obtained particularly during the induction period are much more satisfactory, both with respect to butadiene yield and normal butene recovery. The yield of butadiene is initially much nearer the maximum value corresponding to the normal butenes converted, and isobutene formation is at a very low percentage throughout. The decline in catalyst activity is also much slower than with untreated bauxite, and the use of the preferred catalyst increases the length of the permissible conversion period by as much as 25 to 100 per cent over that obtained with untreated bauxite catalyst.

The action of magnesium hydroxide and barium or strontium hydroxide in our process is distinctly different from the action on bauxite of alkali metal hydroxides. Treatment of bauxite for example, with up to five per cent of sodium hydroxide causes yields during the induction period to be slightly greater, but the rate of decline of catalyst activity is not greatly different from untreated bauxite, and there is substantially no comparable reduction in isomerization. In both these respects, the effects obtained, with alkali metal hydroxides differs markedly from those obtained with magnesium and/or barium hydroxides.

The action of magnesium hydroxide is moreover clearly different from that of barium and strontium hydroxides. The reduction of isomerization seems to be peculiar to magnesium hydroxide while barium and strontium hydroxides show little modifying action in this respect. Conversion to light gases, heavy polymer, tar and cokes on the other hand is not appreciably affected by the magnesium hydroxide treatment, while barium and strontium hydroxides produce a marked reduction in these undesired reactions. Calcium oxide is generally unsatisfactory for either purpose.

The exact mechanism by which these hydroxides alter the catalytic properties of bauxite is not fully understood, nor is such understanding necessary to successful operation of our process. It is possible to explain the action of these compounds on bauxite by assuming that certain constituents of the bauxite capable of promoting cracking, polymerization, and isomerization are thereby neutralized and rendered inactive. It is certain that deposition of these compounds on the surface of the bauxite does not greatly deactivate it for dehydrogenation or prevent achieving substantially equilibrium conditions under previously mentioned dehydrogenation conditions.

Magnesia has been employed alone as a catalyst in dehydrogenation of hydrocarbons. When applied to olefins, however, it has been found to produce only relatively poor yields of diolefins due to the predominance of cracking at the temperatures required for the dehydrogenation. This is particularly true of synthetic magnesia and/or of prepared catalysts consisting essentially of magnesia. These catalysts are, therefore, unsatisfactory from the standpoint of hydrocarbon losses by decomposition under the above-described conditions.

In the catalyst of the present invention, the desired property of the magnesia in suppressing isomerization is successfully imparted to the active catalyst bauxite by our process of impregnation with minor amounts of magnesia. We believe that the active dehydrogenation catalyst in this composition is the bauxite, and that it does not serve merely as a carrier. This theory is based on the fact that the reactions occurring and the products formed represent the results obtained with natural bauxite catalyst in all respects except suppressed formation of isoolefins. Magnesia alone does not produce comparable results, even when supported on carriers other than bauxite. The effect we achieve is apparently the elimination of those characteristics of bauxite which promote the undesired branching of the olefin molecule.

The action of barium and strontium hydroxides is similarly explainable as a neutralization of certain acidic constituents of the bauxite, such as silica and silicates and the like capable of promoting cracking and polymerization. Barium and strontium hydroxides have not been found to promote dehydrogenation themselves even when supported on porous carriers but apparently act principally to modify the catalytic characteristics of the bauxite.

Magnesium oxide remains solid and undissociated up to temperatures much higher than those used in dehydrogenation of olefins. Thus, this material, as in the case with barium and strontium hydroxides, remains in place without reacting with alumina and loses none of this modifying effect in repeated cycles of use and regeneration. In this respect, the modifying components of our catalyst are different from the alkali metal hydroxides which lose their modifying and/or deactivating effect after exposure to relatively high temperatures.

The following examples will serve to more fully illustrate the results which may be obtained by our invention. However, since the number of examples could be multiplied greatly, the ones given here are merely illustrative, and are not to be construed as limiting the invention.

*Example I*

A catalyst was prepared by impregnating 12–20 mesh calcined bauxite with five per cent by weight of barium hydroxide by spraying on in hot aqueous solution. The catalyst was dried at a high temperature, and then impregnated with five per cent by weight of magnesium hydroxide by spraying on in a strong solution of ammonium chloride and ammonium hydroxide. The catalyst was again dried, the ammonia and ammonium salts decomposed and removed by heating to a high temperature in a stream of inert gas. The substantially dehydrated material was then used for dehydrogenation of butene-2. Butene-2 was diluted with steam to a partial pressure of 0.25 atmosphere and then passed over the catalyst maintained at 1200° F. at a space velocity of 1300 volumes per hour and at near atmospheric pressure. Analysis of the effluent vapors showed an initial conversion to butadiene of 14 per cent of the butene-2 charged; this conversion increased to 20 per cent in two hours and then slowly declined to about 12 per cent after 10 hours operation. The isobutene content of the effluents amounted to only about three per cent of the butene initially, and this component declined after about an hour to a level of about 1.0 per cent based on the butene charged. Efficiency in the conversion to butadiene rose from about 33 per cent initially to about 50 per cent during the later hours of the test, and averaged 42 per cent of the butene-2 converted during the ten-hour period.

Untreated bauxite was used as the catalyst under the same operating conditions and showed an initial conversion to butadiene of only about 6 per cent of the butene charged while 12 per cent was converted to isobutene. Isobutene formation fell slowly to about 2 per cent at the end of the period, but destruction of butene-2 to light gases and carbon was excessive in the early hours of the period so that the efficiency in conversion to butadiene was only about 15 per cent initially. The average efficiency was only about 30 per cent and reactivation of the catalyst was necessary after a conversion period of only six hours.

*Example II*

A catalyst was prepared from 8–16 mesh calcined bauxite by spraying on four per cent by weight of strontium hydroxide in hot solution. After calcining, the catalyst was impregnated with four per cent of magnesium hydroxide by spraying on a solution of magnesium acetate, drying and precipitating the hydroxide with a slight excess of ammonium hydroxide. After calcining to dry the catalyst and drive off the ammonium salt, the catalyst was used for dehydrogenation of butene-1. Butene-1 diluted with steam to a partial pressure of 0.25 atmosphere was passed over the catalyst at 1300 volumes per hour at 1190° F. and near atmospheric pressure. Conversion to butadiene rose from an initial value of 13 per cent of the butene to 19.5 per cent and gradually declined to 12.5 per cent after 8 hours operation. Isobutene formation fell from an initial value of four per cent of the butene charge to less than one per cent at the end of the test, and averaged about 1.5 per cent. The efficiency in conversion to butadiene rose from an initial 30 per cent to 48 per cent at the end of the test, averaging 41 per cent over the eight-hour period.

*Example III*

The catalyst of Example I was regenerated and used for dehydrogenation of pentene-2. Pentene-2 was diluted with steam to 0.20 atmosphere pressure and passed over the catalyst at 1400 volumes per hour at 1150° F. and atmospheric pressure. During a six-hour conversion period, an average conversion to pentadienes of about 12 per cent was obtained. Isomerization was kept below two per cent of the pentene charged and the efficiency in conversion to pentadiene was about 35 per cent.

*Example IV*

A catalyst was prepared in which calcined bauxite was impregnated with five per cent by weight of magnesium hydroxide by alternately spraying on portions of a very fine suspension of magnesium hydroxide and calcining at a high temperature until the desired amount was added. This catalyst was used for the dehydrogenation of butene-2 at 1200° F. under conditions similar to those used in Example I. Conversion to butadiene rose from an initial value of six per cent to a maximum of 19 per cent and declined to 13 per cent in a six-hour period. Efficiency in the conversion to butadiene was 22 per cent initially, and after two hours rose to 40 to 45 per cent. Isobutene equivalent to three per cent of the butene charge was formed at first but this value decreased rapidly to about one per cent. Under similar conditions, the untreated bauxite of Example I showed isobutene formation of 12 per cent initially.

While the foregoing disclosure has dealt specifically with the conditions and operations accompanying the conversion of butenes to butadiene, we have noted that our process with certain obvious and necessary modifications may be applied to the dehydrogenation of higher olefins such as pentenes and hexenes to produce corresponding diolefins. Also, the broad principles disclosed are applicable to other catalytic conversions wherein the isomerization of normal olefins is to be suppressed and/or the modification of catalyst activity is desirable to improve process efficiency. The invention therefore is limited only by the scope of the appended claims.

We claim:

1. The process of dehydrogenating aliphatic monoolefins of at least four carbon atoms per molecule to the corresponding aliphatic conjugated diolefins which comprises contacting said mono-olefins at a temperature of from about 1100° to about 1300° F. with a catalyst consisting essentially of bauxite impregnated with from about 1 to about 10% of magnesium oxide and with from about 1 to about 10% of a hydroxide selected from the group consisting of barium and strontium hydroxides.

2. A process for the dehydrogenation of normal aliphatic olefins to produce diolefins which comprises passing said olefins in admixture with sufficient inert diluent to maintain the partial pressure of said olefins below atmospheric pressure into contact at elevated temperatures within the range of about 1100° F. to about 1300° F. and at low superatmospheric pressure with a catalyst comprising a major proportion of bauxite impregnated with minor proportions of magnesium oxide and barium hydroxide.

3. A process as in claim 2 in which the olefin charge stock comprises normal butenes.

4. A process for the dehydrogenation of normal butene to produce butadiene which comprises admixing with a hydrocarbon feed stock containing said butenes, steam in excess of the quantity of butenes by volume and in amount sufficient to maintain the partial pressure of said olefins below one atmosphere under the dehydrogenation conditions, and passing said mixture at low superatmospheric pressure within the range of about 0 to about 200 lbs. per sq. in. gage into contact with bauxite as dehydrogenation catalyst modified by incorporation therewith minor proportions of magnesium oxide and barium hydroxide.

WALTER A. SCHULZE.
JOHN C. HILLYER.
HARRY E. DRENNAN.